(12) United States Patent
Chang et al.

(10) Patent No.: US 9,882,967 B2
(45) Date of Patent: Jan. 30, 2018

(54) PROCESSING INCOMING TRANSACTIONS BASED ON RESOURCE UTILIZATION STATUS OF BACKEND SYSTEMS IN AN APPLIANCE CLUSTER

(71) Applicant: INTERNATIONAL BUSINESS MACHINES CORPORATION, Armonk, NY (US)

(72) Inventors: Chun-Fei Chang, New Taipei (TW); Jeffrey C H Liu, Taipei (TW); Joey H Y Tseng, Taipei (TW); Hao-Ting Shih, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/494,705

(22) Filed: Sep. 24, 2014

(65) Prior Publication Data
US 2015/0095500 A1 Apr. 2, 2015

(30) Foreign Application Priority Data
Sep. 30, 2013 (TW) .............................. 102135605 A (51) Int. Cl.
*H04L 29/08* (2006.01)
*G06F 11/34* (2006.01)
(Continued)

(52) U.S. Cl.
CPC ................ *H04L 67/10* (2013.01); *G06F 9/00* (2013.01); *G06F 9/50* (2013.01); *G06F 11/00* (2013.01);
(Continued)

(58) Field of Classification Search
CPC . H04L 67/10; H04L 12/4641; H04L 63/0209; G06F 11/00; G06F 9/00
See application file for complete search history.

(56) References Cited

U.S. PATENT DOCUMENTS 6,496,479 B1   12/2002   Shionozaki
6,728,748 B1    4/2004   Mangipudi et al.
(Continued)

FOREIGN PATENT DOCUMENTS

| CN | 102685237 A  | 9/2012 |
| TW | 201108692 A  | 3/2011 |
| WO | 2010014778 A1 | 2/2010 |

OTHER PUBLICATIONS

F. Wuhib et al. "Decentralized Service Level Monitoring using Network Threshold Crossing Alerts", IEEE, IEEE Communications Magazine, vol. 44, No. 10, Oct. 2006, pp. 1-10.
(Continued)

*Primary Examiner* — Dustin Nguyen
*Assistant Examiner* — Javier O Guzman
(74) *Attorney, Agent, or Firm* — Law Office of Jim Boice (57) ABSTRACT

A processor-implemented method and/or computer program product negotiates the processing of incoming transactions based on resource utilization status of backend systems in an appliance cluster. An incoming transaction, which is a specialized function for an appliance, is received by a processor. The processor determines whether the incoming transaction can be processed by the appliance cluster based on a current threshold level and a current transaction count, and then identifies a target appliance from the appliance cluster as a negotiation device in response to determining that the incoming transaction cannot be processed.

20 Claims, 4 Drawing Sheets

(51) Int. Cl.
*G06F 9/50* (2006.01)
*G06F 11/00* (2006.01)
*G06F 9/00* (2006.01)
*H04L 12/46* (2006.01)
*H04L 29/06* (2006.01)

(52) U.S. Cl.
CPC ...... *G06F 11/3433* (2013.01); *G06F 2201/81* (2013.01); *G06F 2201/87* (2013.01); *G06F 2201/88* (2013.01); *H04L 12/4641* (2013.01); *H04L 63/0209* (2013.01)

(56) References Cited

U.S. PATENT DOCUMENTS

| | | | |
|---|---|---|---|
| 7,693,996 | B2 | 4/2010 | Wexler et al. |
| 7,757,236 | B1 | 7/2010 | Singh |
| 7,801,987 | B2 | 9/2010 | Grell et al. |
| 7,912,975 | B2 | 3/2011 | Grossner et al. |
| 7,996,842 | B2 | 8/2011 | Savit |
| 8,260,893 | B1 | 9/2012 | Bandhole et al. |
| 2010/0046531 | A1 | 2/2010 | Louati et al. |
| 2010/0235409 | A1* | 9/2010 | Roy ............ G06F 17/30094 707/812 |
| 2012/0096183 | A1* | 4/2012 | Mercuri ............ G06F 9/5027 709/241 |
| 2012/0166893 | A1* | 6/2012 | Chen ............ G06F 11/0778 714/57 |

OTHER PUBLICATIONS

Anonymous "Scale and Protect DNS Infrastructure and Optimize Global App Delivery"0 F5 Networks, Inc., 2014, pp. 1-15.

J. Rodriguez et al, "IBM Websphere DataPower SOA Appliances Part IV: Management and Governance", Apr. 23, 2008, p. 1-148, IBM Redbooks, IBM Corporation.

D. Anderson et al., "WebSphere Everyplace Connection Manager: Increasing Mobile Security, Reducing Wireless Costs", IBM Corporation, White Paper, Jul. 2004, pp. 1-15.

A. Jones et al., "IBM SmartCloud Enterprise Tip: Build Multiple VPNs and VLANs", IBM Corporation, DeveloperWorks, Feb. 6, 2012, pp. 1-13.

A. Jones et al., "IBM SmartCloud Enterprise Tip: Span Virtual Local Area Networks", IBM Corporation, DeveloperWorks, Sep. 16, 2011, pp. 1-5.

Anonymous, "Introduction to High Availability", Oracle, 2011, retrieved Aug. 27, 2014, pp. 1-6.

* cited by examiner

| Appliance 310 | Incoming transaction unit 320 | Outgoing transaction unit 330 | Spared transaction threshold unit 340 |
|---|---|---|---|
| A | 0 | 0 (+1) = 1 | +2 |
| B | Self | Self | +1 |
| C | 0 | 0 | -2 |
| D | 0 | 0 | -1 |

FIG. 3A

| Appliance 310 | Incoming transaction unit 320 | Outgoing transaction unit 330 | Spared transaction threshold unit 340 |
|---|---|---|---|
| A | Self | Self | +2 |
| B | 0 (+1) = 1 | 0 | +1 |
| C | 0 | 0 | -2 |
| D | 0 | 0 | -1 |

PROCESSING INCOMING TRANSACTIONS BASED ON RESOURCE UTILIZATION STATUS OF BACKEND SYSTEMS IN AN APPLIANCE CLUSTER

BACKGROUND

The present invention relates to technology of enhancing the efficiency of appliance networks, and more particularly, to a negotiation apparatus and computer program product for processing incoming transactions based on resource utilization status of backend systems in an appliance cluster.

As the Internet advances, ever-increasing information services are offered to users. The users expect a certain degree of quality of the information services in terms of response time and throughput (TPS), etc. As soon as the thresholds of specified (monitored) indicators are reached, the infrastructure of information services must provide a mechanism for measuring the current status and giving an appropriate response to ensure the service quality anticipated by the users.

In practice, to maintain high availability of services, enterprises or organizations nowadays duplicate the same system in different areas to allow network engineers to achieve disaster recovery in the shortest possible time. High availability is an important dimension of the disposition of multiple appliances which form a cluster, especially appliance products of the processing units owned by enterprises and disposed in a demilitarized zone (DMZ).

To make good use of available resources, enterprises usually use (active/active) high availability architecture whereby systems at different locations can support each other. In practice, an appliance that serves as a reverse proxy is disposed at every location in the DMZ to protect backend systems, i.e., the intranet resources 107. The reverse proxy controls traffic by well-known service level monitoring (SLM) to prevent the backend systems from being overwhelmed by unanticipated burst messages. Examples of the messages include a packet, a transmission control protocol (TCP) stream and a transaction.

Service level monitoring (SLM) technology usually requires enforcing an SLM policy or regulations to monitor specified indicators and assist a network administrator in identifying a problem instantly and making an appropriate response. The specified indicators are, for example, specific headers of messages received. For instance, HTTP, MQ or FTP packets each carry a unique specific header for identification. According to the prior art, during its operation, an SLM module of an appliance not only monitors the number of incoming messages which carry a specific header and are received by the appliance but also sanctions the way of processing the messages according to the real-time SLM status. For instance, when the number reaches a specified threshold, the reverse proxy performs a specified operation pursuant to the SLM policy. The specified operation is queue (or paraphrased as "shape"), reject (or paraphrased as "throttle"), or pass (or paraphrased as "notify").

However, the SLM policy is basically fixed (such as a fixed threshold) and thus cannot be adjusted. In particular, the SLM policy cannot be adjusted according to the load of all intranet resources of backend systems. If the load of a specific server in backend systems is saturated and the incoming transaction (or message) rate of all the intranet resources is still below a predetermined threshold, the newly received incoming transaction (or message) will still pass the SLM policy and thus cause a specific server in the backend systems to crash, that is, the system will no longer be functional. The incoming transaction rate is also referred to as traffic injection rate. Furthermore, from the perspective of multiple reverse proxies at different positions, there is not any mechanism for switching traffic statuses to optimize the access of available resources at different positions. Due to the lack of load information of backend systems and status information of appliances at different positions in global area, the appliances (reverse proxies) in the DMZ cannot access available resources at different positions.

SUMMARY

In one embodiment of the present invention, a processor-implemented method and/or computer program product negotiates the processing of incoming transactions based on resource utilization status of backend systems in an appliance cluster. An incoming transaction, which is a specialized function for an appliance, is received by a processor. The processor determines whether the incoming transaction can be processed by the appliance cluster based on a current threshold level and a current transaction count, and then identifies a target appliance from the appliance cluster as a negotiation device in response to determining that the incoming transaction cannot be processed.

In one embodiment of the present invention, an appliance comprises: a bus; a memory connected to the bus, wherein the memory stores therein an instruction; and a processing unit connected to the bus, wherein the processing unit executes instructions to: receive an incoming transaction, wherein the incoming transaction is a specialized function for an appliance; determine if the incoming transaction can be processed by the appliance cluster based on a current threshold level and a current transaction count; and identify a target appliance from the appliance cluster as a negotiation device in response to determining that the incoming transaction cannot be processed.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer (program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and compute instructions.

Figure 1:
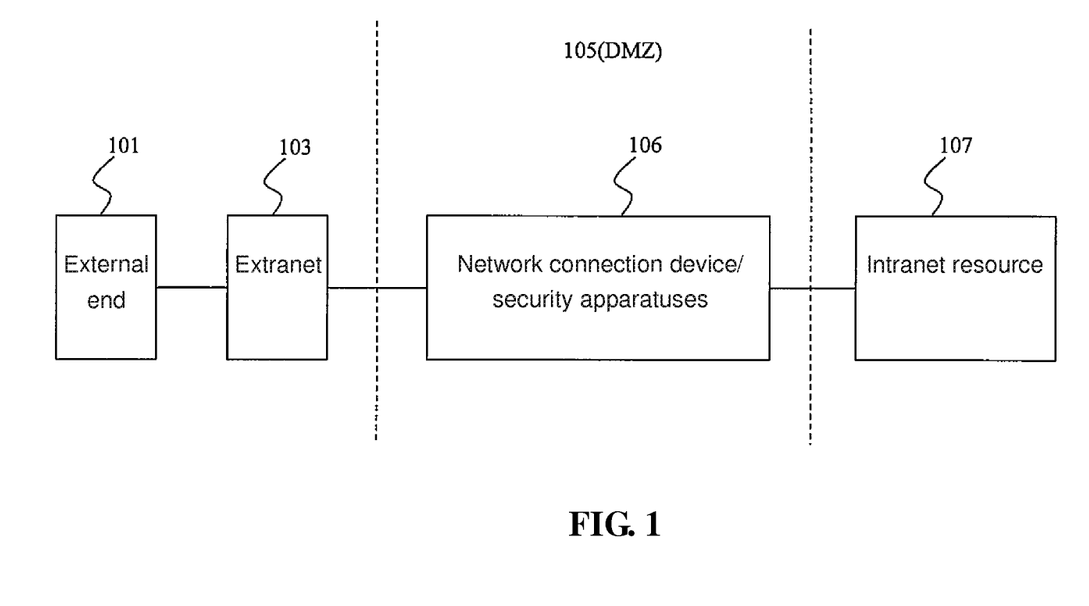
FIG. 1 is a schematic view of a conventional enterprise network.

FIG. 1 is a schematic view of a conventional enterprise network. A user at an external end-point 101 accesses an enterprise-oriented network connection device 106 in a demilitarized zone (DMZ) 105 through an extranet 103. The network connection device 106 is adapted to control network packet flow direction and exemplified by a switch, bridge, and router. Conventional network security apparatuses, such as a firewall, intrusion detection system (IDS), and intrusion prevention system (IPS), can also be disposed in the DMZ 105 and coupled to the network connection device 106. For details of the framework of the network connection device 106, refer to Cisco's switch products, such as Cisco Catalyst 3550 Series Switch. Intranet resources 107 include but are not limited to specific appliances and servers. The intranet resources 107 each comprise appliances, servers or a combination thereof. For example, the intranet resources 107 represent a local area network (LAN).

An appliance, also known as an Internet appliance, is built-in with networking capability and has a specific functional device, such as a gateway, router, network attached storage, wireless network access point, digital TV set top box, and network file sharing server. For further details of the appliance, refer to IBM® WebSphere® DataPower Series SOA Appliances or Tivoli® ISS Appliances® (IBM, WebSphere, and Tivoli are registered trademarks owned by International Business Machine in the United States and/or the other countries.)

Unlike general-purpose computer devices, appliances are designed according to specific purposes or specific services to conduct specific transactions and thus have robust performance. As compared to general-purpose computer devices, appliances are relatively closed, because the specific operating systems and applications (or drivers) adopted by appliances depend on their specific purposes or specific services.

The intranet resources 107 are a virtual local area network (VLAN). By VLAN technology, a network engineer performs logical grouping on apparatuses provided in internal resources of enterprises or organizations and located in different physical area networks, so as to provide full information security.

Furthermore, typical enterprises or organizations ensure the security of internal data by a virtual private network (VPN), wherein a VPN server is disposed in the DMZ 105 to enable the user to access internal resources through an external connection. The VPN server is coupled to the network connection device 106. The user at the external end-point 101 logs in the VPN server and, after being authenticated and authorized, gets connected to the network connection device 106 through the VPN. In some embodiments, the VPN server is dispensable, that is to say, the user at the external end-point 101 gets connected to the network connection device 106 and the intranet resources 107 not necessarily through the VPN. Any other hardware (not shown) and software components (not shown), such as an additional computer system, a router, and a firewall, can be disposed at the network 103 between the VPN server (or the network connection device 106) and the external end-point 101.

Figure 2:
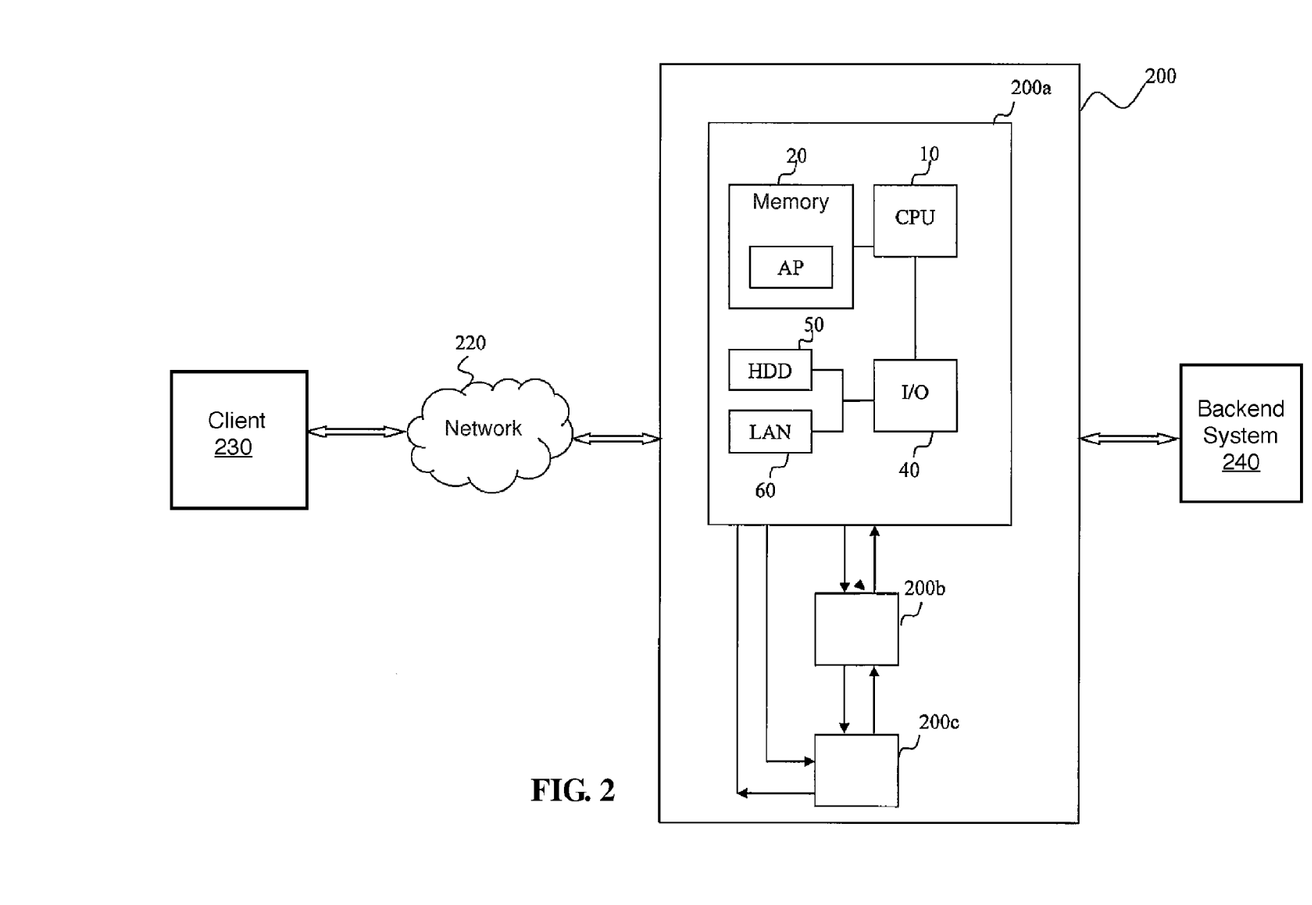
FIG. 2 is a block diagram of the hardware environment of a cluster of a plurality of appliances according to an illustrative embodiment of the present invention.
Figure 3A:
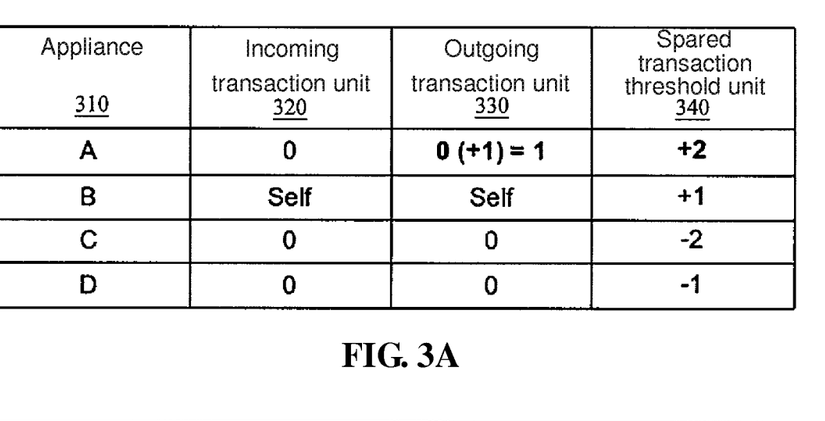
FIG. 3A is a schematic view of a transaction distribution table in appliance member B during the operation of a negotiation mechanism according to an embodiment of the present invention.
Figure 3B:
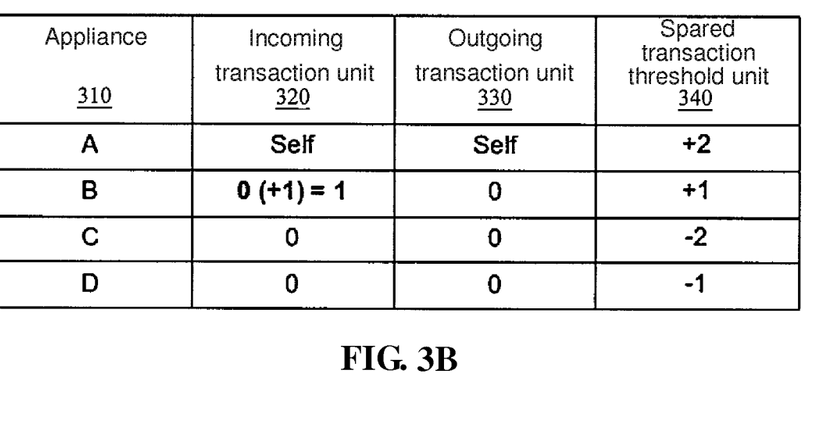
FIG. 3B is a schematic view of a transaction distribution table in appliance member A during the operation of a negotiation mechanism according to an embodiment of the present invention.
Figure 4:
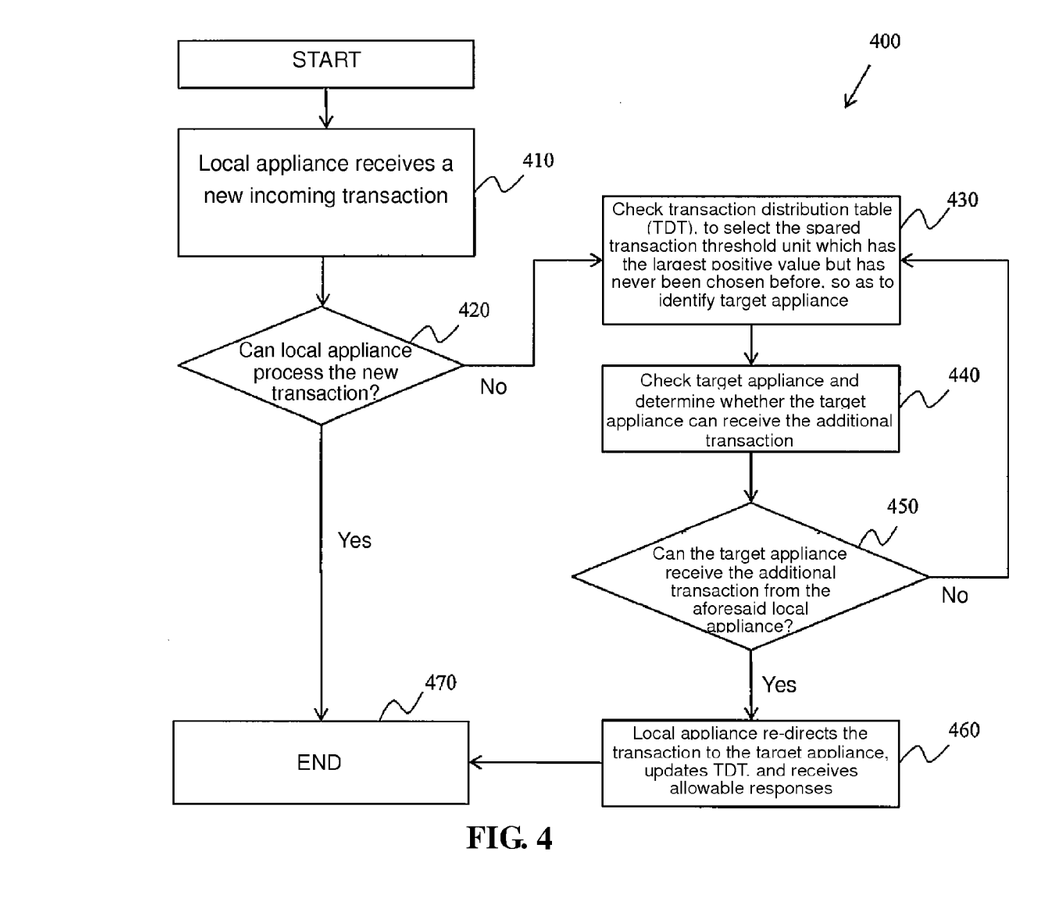
FIG. 4 is a flow chart of a method for an SLM transaction threshold negotiation module according to an embodiment of the present invention.

Referring to FIG. 2 through FIG. 4, there are shown a block diagram, schematic views, and a flow chart of the practicable frameworks, functions, and operation of appliances, a method, and a computer program product according to different embodiments of the present invention. Hence, each block of the block diagram or flow chart denotes a module, segment, or a portion of a program code, which includes one or more executable commands for performing specified logical functions. In other embodiments, the functions described in the blocks are not necessarily performed in accordance with the sequence indicated in the diagram. For example, two connected blocks in the diagram can be executed simultaneously. Alternatively, in some situations, the functions involved may be executed in a sequence opposite to the one shown in the diagram. Each block of the block diagram and/or flow chart and a combination of the blocks of the block diagram and/or flow chart is implemented with a hardware system based on a special purpose, or their specific functions or operations are performed by a combination of special-purpose hardware and computer commands.

Hardware Environment

Referring to FIG. 2, there is shown a schematic block diagram of the hardware environment of a cluster of a plurality of appliances according to an illustrative embodiment of the present invention. In an embodiment, a cluster 200 comprises three appliances (200a, 200b, 200c). The appliances are the hardware framework of IBM's WebSphere DataPower Series SOA Appliances or Tivoli ISS Appliances. The appliances (200a, 200b, 200c) each have a processor for executing a dedicated application, a storage device for storing various data and program codes, a communication and output/input device serving as an interface for communication with the user, and a peripheral component or other specific-purpose components. In the other embodiments, the present invention is implemented in other forms and thus has fewer or more other devices or components. Messages received from the client 230 through a network 220 are sent by the appliances (200a, 200b, 200c) of the cluster 200 to a backend system 240 of a subsequent network server. Multiple appliances in the cluster each send its own SLM data to the other appliances by unicast or multicast, thereby synchronizing the SLM statuses of the multiple appliances in the cluster.

Referring to FIG. 2, the appliances (200a, 200b, 200c) each have a processor 10, a memory 20, and an input/output (I/O) unit 40. The input/output (I/O) bus is a high-speed serial bus, such as PCI-e bus, or any bus structure. Connection of the input/output (I/O) bus is achieved by direct component interconnection or by means of an add-in card. The input/output (I/O) unit is coupled to a hard disk drive 50 and a local area network (LAN) adaptor 60. Through the LAN adaptor 60, the appliances (200a, 200b, 200c) communicate with a client computer through a network 220. The network can also be any form of connection, such as a fixed connection, including a local area network (LAN) or a wide area network (WAN), or dial-up Internet access provided by an Internet service provider (ISP). Alternatively, the network is not restricted to various wired or wireless connections, for example, communication with a client computer through a wireless network, such as GSM or Wi-Fi. The network includes the other hardware and software components (not shown), such as an additional computer system, a router, and a firewall. The memory 20 is a random access memory (RAM), a read-only memory (ROM), or an erasable programmable read-only memory (EPROM or flash memory). The memory 20 stores an operating system, program code of a dedicated application AP, and various data. The operating system runs on the processor (CPU) 10 to coordinate and control various components in the appliances (200a, 200b, 200c). The processor 10 accesses the memory 20 in order to execute the application AP.

The application AP comprises an SLM transaction threshold negotiation module and a transaction distribution table of the present invention. The SLM transaction threshold negotiation module comprises program modules and commands. The program modules and commands adjust the current transaction threshold of an appliance. The adjustment is based on the current load of backend systems (i.e., the intranet resources 107), that is, the resource utilization status (such as CPU/memory utilization rate). The SLM transaction threshold negotiation module of an appliance starts to interact with the other appliances and switches current available transaction processing capability with the other appliances in case of satisfaction of a predetermined requirement and determination that the other peer negotiation in a group/cluster is capable of processing a transaction. The SLM transaction threshold negotiation module preserves the status of distribution of transactions in the group/cluster. The SLM transaction threshold negotiation module is driven either intermittently (or periodically) or by an event. For example, in the event of a drastic change in the threshold, the SLM transaction threshold negotiation module will be driven by the event, otherwise it will be driven periodically.

The SLM transaction threshold negotiation module is either a module in the application or a daemon. In another embodiment, the SLM transaction threshold negotiation module is a program provided in the other form. The SLM transaction threshold negotiation module includes codes for use in describing the process flow depicted in FIG. 4.

Persons skilled in the art understand that the hardware of the appliances (200a, 200b, 200c) illustrated with FIG. 2 varies from embodiment to embodiment. Hence, the hardware of the appliances (200a, 200b, 200c) illustrated with FIG. 2 may be supplemented or replaced by the other internal hardware or peripheral devices, such as flash read-only memory (Flash ROM), equivalent non-volatile memory, or CD-ROM drive.

The present invention involves introducing a negotiation mechanism into an existing SLM mechanism. With the multiple appliances being present in the same group/cluster, it is reasonable to assume that the appliances each have the same backend system. The present invention provides a transaction distribution table for tracking incoming transactions (or messages) and outgoing transactions dynamically. The negotiation module adjusts an SLM threshold unit dynamically according to the transaction distribution table. Whenever a new incoming transaction is sent to one of the multiple appliances, the appliance checks its transaction distribution table, so as to determine whether it can process the incoming transaction. If the appliance cannot process the incoming transaction, it will determine whether the other appliances can process the new incoming transaction and whether the new incoming transaction can be re-directed to another appliance. Whenever the new incoming transaction is re-directed, the incoming transaction unit, the outgoing transaction unit and the spared transaction threshold unit are updated/adjusted by the negotiation module.

Transaction Distribution Table

FIG. 3A is a schematic view of a transaction distribution table in appliance member B during the operation of a negotiation mechanism according to an embodiment of the present invention. FIG. 3B is a schematic view of a transaction distribution table in appliance member A during the operation of a negotiation mechanism according to an embodiment of the present invention. In an embodiment of the present invention, the table includes four appliance members in a group/cluster, namely member A, member B, member C and member D. The embodiment is illustrative rather than restrictive of the number of the appliance members in a group/cluster. The table further includes three fields, namely an incoming transaction unit, an outgoing transaction unit and a spared transaction threshold unit. The "Self" value merely indicates that the appliance member B is a local appliance.

An incoming transaction unit 320 represents the reserved unit of incoming transactions from another appliance.

An outgoing transaction unit 330 represents the reserved (or lent) unit of incoming transactions of a local appliance.

A spared transaction threshold unit 340 represents the reserved unit of an additional incoming transaction of another appliance, wherein spared transaction threshold unit=current threshold level−current transaction count.

In an embodiment of the present invention, the current threshold level is adjustable and thus is also referred to as the dynamic local threshold of a local appliance. By the spared transaction threshold unit, it is practicable to determine whether the local appliance receives an additional incoming transaction. A threshold unit represents the allowable number of all the appliance members in a group/cluster; for example, a unit represents 1000 transactions. Top priority is given to the negotiation right to which the largest spared transaction threshold unit is entitled.

The current threshold level is adjusted according to the load of the intranet resources of backend systems and the current threshold of another appliance at another location. The load is a resource utilization status (such as CPU/memory utilization rate). The resource utilization status of backend systems refers typically to an average resource utilization rate, such as average CPU utilization rate. The average resource utilization rate is conventionally provided by backend systems or detected by an appliance of the DMZ.

The SLM transaction threshold negotiation module of the local appliance starts a negotiation mechanism and transaction processing capability available to another peer negotiation in the group/cluster as soon as a predetermined requirement is met. In an embodiment of the present invention, top priority is given to the negotiation at the appliance which has the largest spared transaction threshold unit.

In an embodiment of the present invention, the rationale for the predetermined requirement is as follows: if the current resource utilization rate falls between a predetermined average resource utilization rate, say 60%, and a negotiation margin which is attributed to the current transaction count and approximates to the predetermined average resource utilization rate, say 50%, then a reasonable assumption regarding the point in time at which the next resource utilization rate is detected will be as follows: the next resource utilization rate is going to surpass the predetermined average resource utilization rate. For example, assuming that the resource utilization rate at the time T2 is 55%, the resource utilization rate falls between the negotiation margin (set to 50%) and the predetermined average resource utilization rate (set to 60%). Hence, the reasonable assumption is: the next resource utilization rate is going to surpass the predetermined average resource utilization rate. As a result, the SIM transaction threshold negotiation module of the local appliance B checks its own transaction distribution table, so as to start the negotiation mechanism and the negotiation at the appliance which has the largest spared transaction threshold unit as soon as the predetermined requirement is met.

The local appliance B checks a current threshold level and a current transaction count, so as to determine whether it can process any new incoming transaction. As mentioned before, the current threshold level is dynamically adjusted according to the load of intranet resources of backend systems and the current threshold of the other appliances at the other locations. In an embodiment of the present invention, initial threshold level T0 of every appliance is set to 10, and thus the current threshold level depends on the difference between the current resource utilization rate and a predetermined average resource utilization rate (say 60%). Assuming that if the difference between a predetermined average resource utilization rate and the current resource utilization rate equals ±10%, the current threshold level will equal 10±1. If the difference is ±20%, the current threshold level will be 10±2. By analogy, at time T1, if the difference is 10%, the current threshold level will be 10+1=11; at time T2, if the difference is 0%, the current threshold level will stay at 11; and, at time T2, if the difference is −10%, the current threshold level will stay at 11−1=10.

In an embodiment of the present invention, at a specific point in time, if appliance B has its current threshold level adjusted to become 10+1=11 and a current transaction count of 9, then its spared transaction threshold unit=current threshold level−current transaction count=2. Hence, there is a unit of an additional incoming transaction which will be processed and can be reserved for another appliance. That is to say, appliance B is still capable of processing new incoming transactions.

Nonetheless, at a specific point in time, if the adjusted current threshold level of appliance B is less than or equal to the current transaction count of appliance B, then the spared transaction threshold unit of appliance B will be zero or a negative number. Hence, there is not any unit of an additional incoming transaction which will be processed and can be reserved for another appliance. That is to say, appliance B is no longer capable of processing any new incoming transactions. If the local appliance B is no longer capable of processing any new incoming transactions, it will be necessary to start the negotiation mechanism for conducting negotiation in order to preclude saturation and thus a crash of a server in a backend system of the local appliance when the local appliance keeps processing the new incoming transactions received.

Referring to FIGS. 3A and 3B, appliance A has the largest spared transaction threshold unit and thus is preferably chosen to function as a negotiation object of appliance B. If appliance B receives a new incoming transaction (for example, 1 unit of new transaction) at a point in time suitable for negotiation, the adjusted current threshold level of appliance A will be larger than the sum of the current transaction count of appliance A and the unit of new incoming transactions received by appliance B, and thus appliance A will lend 1 unit of incoming transaction to appliance B. At this point in time, appliance A's outgoing transaction unit 330 (i.e., 0+1 unit=1) in appliance B's transaction distribution table shown in FIG. 3A gets updated, whereas appliance B's incoming transaction unit 320 (i.e., 0+1 unit=1) in appliance A's transaction distribution table shown in FIG. 3B gets updated.

SLM Transaction Threshold Negotiation Module

FIG. 4 is a flow chart of a method for an SLM transaction threshold negotiation module according to an embodiment of the present invention. The illustration of FIG. 4 is optimized when FIG. 4 is studied together with FIGS. 3A and 3B.

Step 410: the local appliance B receives a new incoming transaction. The incoming transaction unit is set to 1.

Step 420: determine whether the local appliance B can process the new transaction. The local appliance B checks a current threshold level and a current transaction count, to determine whether it can process new incoming transactions. That is to say, step 420 entails determining whether the sum of the new incoming transaction unit and the current transaction count is less than the current threshold level (new incoming transaction unit+current transaction count<current threshold level).

Step 430: in case of negative determination in step 420, it will mean that the local appliance B is no longer capable of processing any new incoming transactions. Hence, it is necessary to start the negotiation mechanism whereby a target appliance is selected for negotiation. The selection entails checking a transaction distribution table (TDT), so as to select the spared transaction threshold unit which has the largest positive value but has never been chosen before, with a view to identifying a target appliance. Referring to FIGS. 3A and 3B, appliance A has the largest spared transaction threshold unit and thus is preferably chosen to function as a negotiation object of appliance B.

Step 440: check the target appliance (such as appliance A shown in FIG. 3A) and determine whether the target appliance can receive the additional transaction. In this step, appliance A calculates the adjusted current threshold level at the point in time of negotiation and calculates the sum of the current transaction count of appliance A and the unit of new incoming transactions received by appliance B.

Step 450: determine whether the target appliance (such as appliance A shown in FIG. 3A) can receive the additional transaction. At the point in time of negotiation, if the adjusted current threshold level of appliance A is larger than the sum of the current transaction count of appliance A and the unit of new incoming transactions received by appliance B, appliance A will lend 1 unit of incoming transaction to appliance B, that is, appliance A can process the additional transaction.

Presumably, a current threshold level is set to 10, the difference between the current resource utilization rate and a predetermined average resource utilization rate equals 20%, appliance A's current transaction count is set to 9, and the unit of new incoming transactions received by appliance B equals 1. Hence, the adjusted current threshold level of appliance A equals 10+2=12, which is larger than the sum of the current transaction count of appliance A and the unit of new incoming transactions received by appliance B, 9+1=10.

Step 460: the local appliance B re-directs the new incoming transaction to the target appliance (appliance A in this embodiment), updates the TDT, and receives allowable responses from the target appliance. The update involves updating appliance A's outgoing transaction unit 330 (i.e., 1 unit) in appliance B's transaction distribution table shown in FIG. 3A, involves updating appliance B's incoming transaction unit 320 (i.e., 1 unit) in appliance A's transaction distribution table shown in FIG. 3B.

As mentioned before, each appliance has its own current threshold level, which is a dynamic local threshold. Given the transaction distribution table and the current threshold level, it is practicable to create a dynamic global threshold carrying a status message of another appliance in the same group/cluster, that is:

dynamic global threshold=dynamic local threshold (current threshold level)+sum of outgoing transaction unit−sum of incoming transaction unit The dynamic global threshold functions as a definite indicator of optimized utilization of available resources of appliances positioned at different locations and attributed to the same group/cluster.

The present invention provides a method of dynamically adjusting a threshold in an SLM policy such that the adjusted threshold is available to an appliance (reverse proxy or firewall) of typical enterprises or organizations. The threshold is adjusted according to the resource utilization status (for example, CPU/memory utilization rate) of backend systems and the current thresholds of appliances at the other locations. Given the resource utilization status of the backend systems and the status (i.e., global knowledge) of the other appliances, an appliance at one location can interact with appliances at the other locations to gain access to a negotiation threshold and route incoming transactions (or messages) to the other locations anew for further processing as needed.

The present invention involves introducing a negotiation mechanism into an existing SLM mechanism. The present invention is characterized in that: whenever multiple appliances of the same group are present and have the same backend system, incoming transactions (or messages) and outgoing transactions are tracked with a transaction distribution table of the present invention; and an SLM transaction threshold negotiation module dynamically adjusts an SLM threshold unit. A threshold unit represents an allowable number of all the appliance members in a group/cluster; for example, a unit represents 1000 transactions. Whenever an incoming transaction is sent to one of the multiple appliances, the appliance checks its transaction distribution table to determine whether it can process the incoming transaction. If the appliance cannot process the incoming transaction, the appliance determines whether the other appliances can process the incoming transaction and whether the incoming transaction can be re-directed to another appliance. Whenever the incoming transaction is re-directed, the incoming transaction unit, the outgoing transaction unit and the spared transaction threshold unit are updated/adjusted by the SLM transaction threshold negotiation module.

The foregoing description, the appended claims, and the embodiments of the present invention further illustrate the features and advantages of the present invention.

In an embodiment of the present invention, a negotiation method for processing incoming transactions based on resource utilization status of backend systems in an appliance cluster comprises the steps of: receiving an incoming transaction; determining if the incoming transaction can be processed based on a current threshold level and a current transaction count; and identifying a target appliance as a negotiation object in response to that the incoming transaction cannot be processed.

In another embodiment of the present invention, a computer program product comprising a computer-readable medium having therein a stored program code executable on multiple appliances in a cluster to implement the negotiation method for processing incoming transactions based on resource utilization status of backend systems in an appliance cluster.

According to another embodiment of the present invention, an appliance comprises: a bus; a memory connected to the bus, wherein the memory stores therein an instruction; and a processing unit connected to the bus, wherein the processing unit executes the instruction to implement the aforesaid negotiation method for processing incoming transactions based on resource utilization status of backend systems in an appliance cluster.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, the foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method of negotiating processing of incoming transactions in an appliance cluster, the method comprising:
   receiving, by a receiving appliance in an appliance cluster, an incoming transaction from a client device via a network, wherein the incoming transaction is a specialized function for an appliance in the appliance cluster, and wherein all appliances in the appliance cluster share a same backend system that is in network communication with the appliance cluster;
   determining, by one or more processors, whether the incoming transaction can be processed by the receiving appliance based on a current threshold level and a current transaction count of the receiving appliance, wherein the current threshold level is a sum of a first quantity of transactions that can be handled by a first appliance in the appliance cluster plus a second quantity of transactions that can be handled by a second appliance in the appliance cluster on behalf of the first appliance;
   identifying, by one or more processors, a target appliance from the appliance cluster as a negotiation device in response to determining that the incoming transaction cannot be processed by the receiving appliance, wherein the negotiation device negotiates with another appliance in the appliance cluster to receive the incoming transaction; and
   sending, from the negotiation device to a lending appliance in the appliance cluster, the incoming transaction, wherein the lending appliance is an original member of the appliance cluster, wherein the lending appliance has a highest amount of available capacity to handle transferred transactions from other appliances in the appliance cluster, wherein the highest amount of available capacity is based on the lending appliance having a greater current threshold level than any other appliance in the appliance cluster, and wherein the lending appliance has never been chosen before to receive a transferred incoming transaction from another appliance in the appliance cluster.

2. The method of claim 1, wherein the current threshold level is adjusted according to a resource utilization status of the backend system.

3. The method of claim 1, further comprising:
   adjusting, by one or more processors, the current threshold level to create an adjusted current threshold level, wherein the adjusted current threshold level is a sum of the current threshold level plus a percentage of the current threshold level as set by an average resource utilization rate of the backend system by the receiving appliance.

4. The method of claim 1, wherein said determining requires determining whether a sum of a unit of the incoming transaction and the current transaction count is less than the current threshold level.

5. The method of claim 1, further comprising:
checking, by one or more processors, a transaction distribution table (TDT) and selecting a spared transaction threshold unit which has the largest positive value but has never been chosen before, thereby identifying the target appliance, wherein the transaction distribution table comprises an incoming transaction unit, an outgoing transaction unit and the spared transaction threshold unit, wherein the spared transaction threshold unit is calculated by subtracting the current transaction count from the current threshold level.

6. The method of claim 5, further comprising:
checking, by one or more processors, the target appliance for capability of receiving the incoming transaction, wherein the target appliance calculates an adjusted value of the current threshold level at a point in time of negotiation and a sum of a current transaction count of the target appliance and a unit of the incoming transaction.

7. The method of claim 6, further comprising:
re-directing, by one or more processors, the incoming transaction to the target appliance and updating a transaction distribution table (TDT) in response to the adjusted value of the current threshold level of the target appliance being larger than the sum of the current transaction count of the target appliance and the unit of the incoming transaction.

8. The method of claim 1, wherein the current threshold level is a threshold in a Service Level Monitoring (SLM) policy.

9. An appliance, comprising:
a bus;
a memory connected to the bus, wherein the memory stores therein an instruction; and
a processing unit connected to the bus, wherein the processing unit executes instructions to:
receive an incoming transaction, wherein the incoming transaction is a specialized function for an appliance in an appliance cluster, and wherein all appliances in the appliance cluster share a same backend system that is in network communication with the appliance cluster;
determine whether the incoming transaction can be processed by a receiving appliance in the appliance cluster based on a current threshold level and a current transaction count of the receiving appliance in the appliance cluster, wherein the current threshold level is a sum of a first quantity of transactions that can be handled by a first appliance in the appliance cluster plus a second quantity of transactions that can be handled by a second appliance in the appliance cluster on behalf of the first appliance;
identify a target appliance from the appliance cluster as a negotiation device in response to determining that the incoming transaction cannot be processed, wherein the negotiation device negotiates with another appliance in the appliance cluster to receive the incoming transaction; and
send the incoming transaction from the negotiation device to a lending appliance in the appliance cluster, wherein the lending appliance is an original member of the appliance cluster, wherein the lending appliance has a highest amount of available capacity to handle transferred transactions from other appliances in the appliance cluster, wherein the highest amount of available capacity is based on the lending appliance having a greater current threshold level than any other appliance in the appliance cluster, and wherein the lending appliance has never been chosen before to receive a transferred incoming transaction from another appliance in the appliance cluster.

10. The appliance of claim 9, wherein the current threshold level is adjusted according to resource utilization status of backend systems.

11. The appliance of claim 10, wherein the current threshold level depends on a difference between a current resource utilization rate and a predetermined average resource utilization rate.

12. The appliance of claim 9, wherein the determination requires determining whether a sum of a unit of the incoming transaction and the current transaction count is less than the current threshold level.

13. The appliance of claim 9, wherein the processing unit further executes instructions to:
check a transaction distribution table (TDT) and select a spared transaction threshold unit which has the largest positive value but has never been chosen before, thereby identifying the target appliance,
wherein the transaction distribution table comprises an incoming transaction unit, an outgoing transaction unit and the spared transaction threshold unit,
wherein the spared transaction threshold unit is calculated by subtracting the current transaction count from the current threshold level.

14. The appliance of claim 13, wherein the processing unit further executes instructions to:
check the target appliance for capability of receiving the incoming transaction, wherein the target appliance calculates an adjusted value of the current threshold level at a point in time of negotiation and a sum of a current transaction count of the target appliance and a unit of the incoming transaction.

15. The appliance of claim 14, wherein the processing unit further executes instructions to:
re-direct the incoming transaction to the target appliance and update a transaction distribution table (TDT) in response to the adjusted value of the current threshold level of the target appliance being larger than the sum of the current transaction count of the target appliance and the unit of the incoming transaction.

16. The appliance of claim 9, wherein the current threshold level is a threshold in a Service Level Monitoring (SLM) policy.

17. A computer program product to negotiate the processing of incoming transactions based on resource utilization status of backend systems in an appliance cluster, the computer program product comprising a computer readable storage medium having program code embodied therewith, wherein the computer readable storage medium is not a transitory signal per se, and wherein the program code is readable and executable by a processor to perform a method comprising:
receiving, by a receiving appliance in an appliance cluster, an incoming transaction from a client device, wherein the incoming transaction is a specialized function for an appliance in the appliance cluster, and wherein all appliances in the appliance cluster share a same backend system that is in network communication with the appliance cluster;

determining whether the incoming transaction can be processed by a receiving appliance in the appliance cluster based on a current threshold level and a current transaction count of the receiving appliance, wherein the current threshold level is a sum of a first quantity of transactions that can be handled by a first appliance in the appliance cluster plus a second quantity of transactions that can be handled by a second appliance in the appliance cluster on behalf of the first appliance;

identifying a target appliance from the applicant cluster as a negotiation device in response to determining that the incoming transaction cannot be processed, wherein the negotiation device negotiates with another appliance in the appliance cluster to receive the incoming transaction; and sending the incoming transaction from the negotiation device to a lending appliance in the appliance cluster, wherein the lending appliance is an original member of the appliance cluster, wherein the lending appliance has a highest amount of available capacity to handle transferred transactions from other appliances in the appliance cluster, wherein the highest amount of available capacity is based on the lending appliance having a greater current threshold level than any other appliance in the appliance cluster, and wherein the lending appliance has never been chosen before to receive a transferred incoming transaction from another appliance in the appliance cluster.

18. The method of claim 1, further comprising:
adjusting, by one or more processors, a current threshold level of the appliance cluster according to a resource utilization status of backend systems that are utilized by the appliance cluster.

19. The method of claim 1, wherein each appliance in the appliance cluster has a unique and dynamic current threshold level.

20. The method of claim 1, further comprising:
receiving, by the negotiation device and from the lending appliance, responses to the incoming transaction from a backend system that is utilized by the appliance cluster.

* * * * *